Sept. 8, 1964
R. A. FERRARA ETAL
3,147,996
SEAT BELT REEL LOCK
Filed Oct. 11, 1962
3 Sheets-Sheet 1
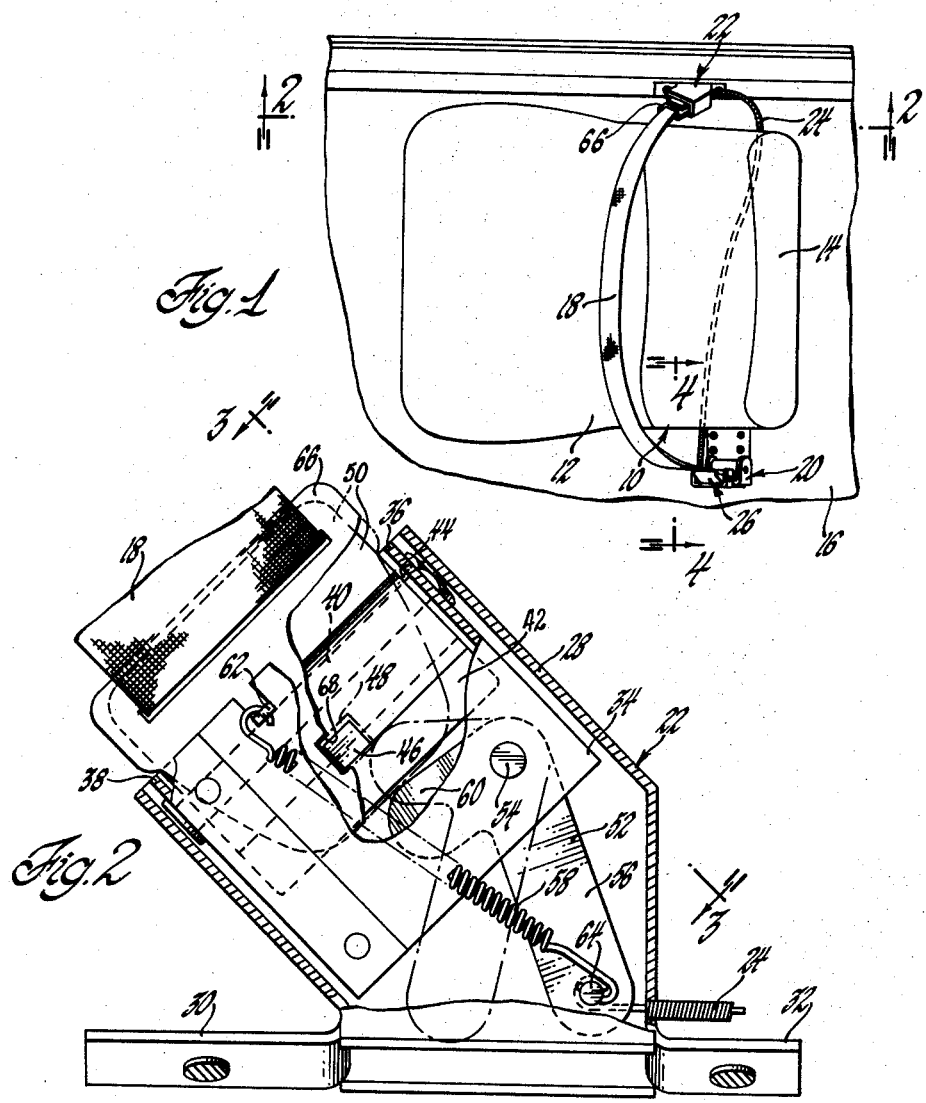
Fig.1
Fig.2
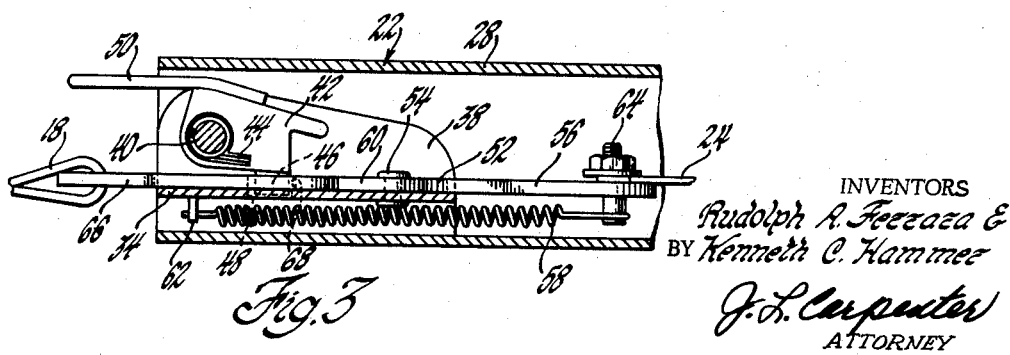
Fig.3
INVENTORS
Rudolph A. Ferrara &
BY Kenneth C. Hammer
J. L. Carpenter
ATTORNEY Sept. 8, 1964

R. A. FERRARA ETAL 3,147,996

SEAT BELT REEL LOCK

Filed Oct. 11, 1962

INVENTORS
Rudolph A. Ferrara &
BY Kenneth C. Hammer

J. L. Carpenter
ATTORNEY

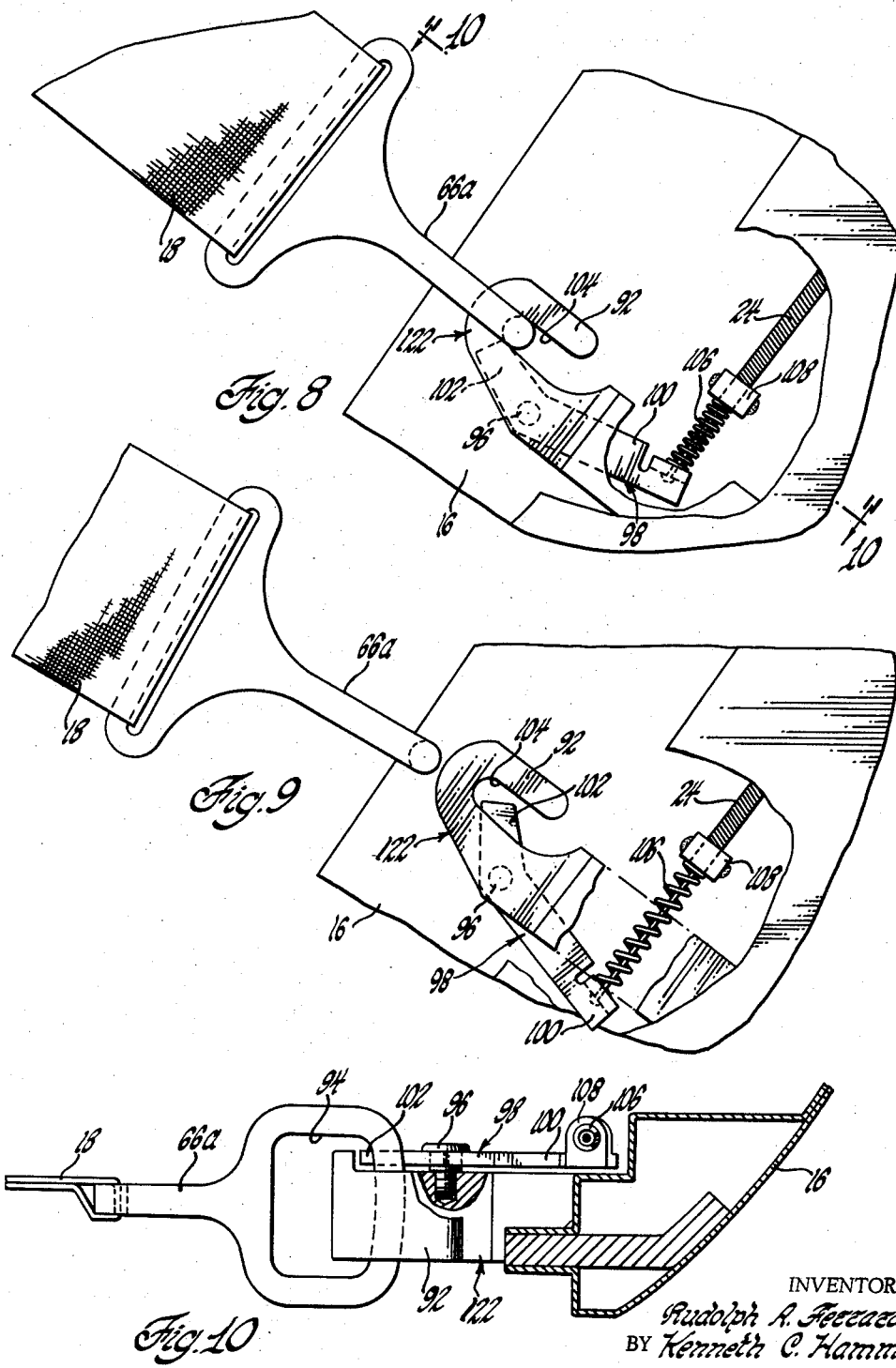

United States Patent Office 3,147,996
Patented Sept. 8, 1964

3,147,996
SEAT BELT REEL LOCK
Rudolph A. Ferrara, Warren, and Kenneth C. Hammer, Madison Heights, Mich., assignors to General Motors Corporation, Detroit, Mich., a corporation of Delaware
Filed Oct. 11, 1962, Ser. No. 229,860
8 Claims. (Cl. 297—388)

This invention relates to a seat belt of the retractable type and more particularly to locking means for securing a seat belt in an operating position.

Due to the unsightliness and inconvenience of having a seat belt lying loosely on the seat or floor adjacent thereto, means for retracting the seat belt to a suitable storage area has been developed. In providing the retracting means, the adjustability of the seat belt has been incorporated into the retracting means. A problem which develops with this arrangement is the manner in which the unused portion of the seat belt, retracted in the storage area, is to be secured from further outward movement when the seat belt is placed in operating position.

An object of this invention is to provide a locking means adjacent the retracting and storage means to prevent the unused portion of the seat belt from being released from the retracting means during use of the seat belt.

A further object of this invention is to provide a locking means for the free end of the seat belt which will actuate the locking means at the retracting end of the seat belt.

Another object of this invention is to provide locking means for the free end of the seat belt for the various types of tongues or hooks which will actuate the locking means at the retracting end of the seat belt.

These and other objects of this invention will become more apparent as reference is had to the accompanying specification and drawings wherein:

FIGURE 1 is a plan view of a portion of a vehicle body showing an individual seat with a retractable seat belt in operating position utilizing the present invention.

FIGURE 2 is an enlarged sectional view of the anchoring means for the free end of the seat belt taken substantially along the line 2—2 of FIGURE 1.

FIGURE 3 is a section view of the free end anchoring means taken substantially along the line 3—3 of FIGURE 2.

FIGURE 8 shows an alternative free end anchoring means in the locked position.

FIGURE 9 shows the alternate anchoring means of FIGURE 8 in the unlocked position.

FIGURE 10 is a view substantially along the line 10—10 of FIGURE 8 showing a top view of the anchoring means in the locked position.

Figure 4:
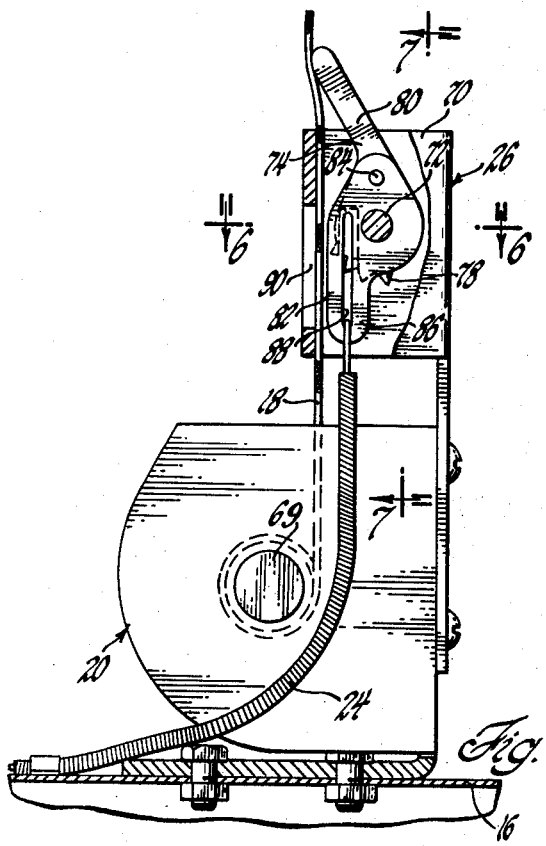
FIGURE 4 is a view taken substantially along the line 4—4 of FIGURE 1 showing a front view of the retracting means and the Bowden cable actuated latching means with parts in sections and broken away.

Referring now more particularly to the drawings, FIGURE 1 shows a seat 10 comprising a cushion 12 and a back 14 mounted in a vehicle body 16. A seat belt assembly illustrative of the invention includes a seat belt 18 shown in an extended operating position. A belt anchoring and storage means 20 is secured to the vehicle body 16 at one side of the seat 10. A free belt end anchoring means 22 is secured to the body adjacent the other side of the vehicle seat. A Bowden control cable 24 runs from the free end anchoring means 22 and is separably connected to a retractable belt end latching means 26 associated with the storage means 20.

Referring now to FIGURES 2 and 3, the free belt end anchoring means shown includes a support bracket or case 28 having mounting flanges 30 and 32 suitably secured to the vehicle body. A base plate 34 mounted within the case 28 has two spaced flanges 36 and 38 which support a shaft or stud 40 parallel to and spaced from the base 34. The shaft 40 pivotally supports a locking lever and cam member 42 which is normally spring biased to a belt locking position by a torsion spring 44 positioned about shaft 40 and anchored in arm 36 and locking cam 42. A locking pawl 46 formed on the locking lever 42 is swingable therewith into and out of belt locking engagement with a receiving aperture 48 formed in the base plate 34. A handle portion 50 on the locking lever 42 provides means for manually swinging the belt locking pawl out of engagement with the aperture 48. A bellcrank lever 52 is pivotally secured to the base plate 34 by a rivet or pivot pins 54. A spring 58 tensively interposed between a finger flange 62 formed from the base plate 34 and a stud 64 carried by one arm 56 of the bellcrank lever 52 normally urges this lever to the position shown in phantom lines in FIGURE 2, wherein the other arm 60 of the bellcrank lever 52 is positioned adjacent aperture 48.

The free end of the seat belt 18, shown in FIGURES 2 and 3, has an anchor tongue plate 66 suitably secured thereto. The tongue 66 has an aperture 68 which cooperates with the pawl 46 to secure the tongue 66 in locked position. When the anchor plate 66 is placed in locked position between the base plate 34 and locking cam 42, the bellcrank 52 is pivoted about rivet 54, extending spring 58 and moving the Bowden control cable 24.

Figure 5:
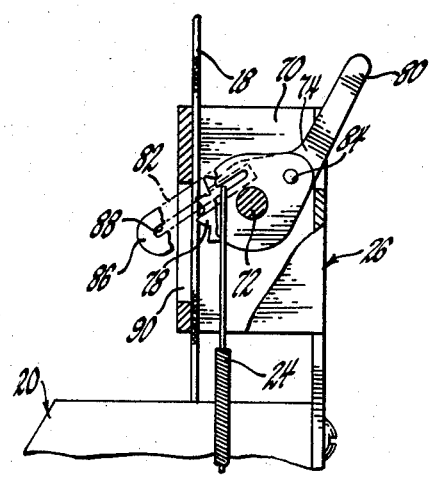
FIGURE 5 shows the latch of FIGURE 4 in the locked position with sections broken away.
Figure 6:
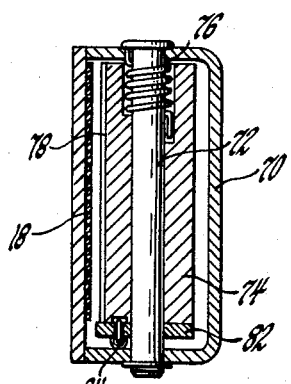
FIGURE 6 is a sectional view taken substantially along line 6—6 of FIGURE 4 showing the spring biased locking cam mounted on its supportive shaft.
Figure 7:
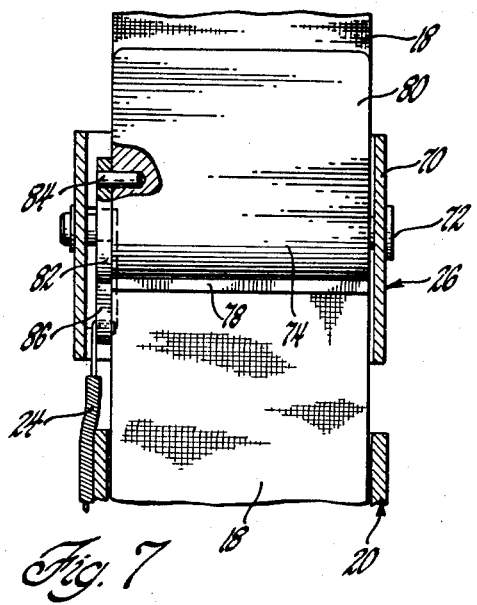
FIGURE 7 is a sectional view taken substantially along line 7—7 of FIGURE 4 showing the side view of the retractable end locking means, with portions broken away.

The seat belt anchoring and storage case 20 as best shown in FIGURE 4 houses and rotatably supports a spring biased retracting reel 69 about which the seat belt 18 is wound and stored when not in use. In the illustrative embodiment, the retractable belt and latching or locking means 26 is suitably supported adjacent the storage case and includes rectangular latch mounting bracket or case 70. A shaft 72 mounted transversely of the case 70 rotatably supports a belt locking pawl 74. This pawl is normally biased to a belt locking position by a helical spring embracing the shaft 72 and torsionally interposed between the pawl 74 and the case 70. The seat belt 18 is threaded between the locking pawl 74 and case 70 of the latching means and then passes into the storage case 26 where it is suitably secured to the retracting reel 69. The locking pawl 74 of the illustrative embodiment is formed with teeth 78 along its belt locking periphery and has a lever arm or handle portion 80 for manual swinging release of the pawl from belt locking engagement. A pawl controlling plate 82 is also rotatably mounted on shaft 72 and secured for pivotal movement with the pawl 74 by a pin 84. The plate 82 has a second pawl actuating arm 86 with a longitudinally extending slot 88 formed therein. The end of the Bowden cable 24 distal from the free belt end anchoring means is movably secured in the slot 88. An aperture 90 formed in the case 70 permits the pawl actuating arm 86 to rotate outwardly of the case as the pawl 74 is rotated from its locked position shown in FIGURE 5 to an unlocked position shown in FIGURE 4. In locked position, the seat belt 18 is compressed between the belt engaging periphery or teeth 78 of the pawl 74 and the case 70 thus preventing any unreeling of the belt 18 from about retracting reel 69.

Referring now to FIGURES 8 through 10, an alternative form of free end anchoring means 122 is shown consisting of a hook member 92 secured to the vehicle body 16 in a suitable manner. The free end of the seat belt 18 is provided with a latch plate 66a suitably secured thereto. The latch plate 66a has an aperture 94 adapted to cooperate with the hook 92 to secure the free end of the seat belt 18 in operating position, as seen in FIGURES 8 and 10. Pivotally secured to the side of the hook member 92 by a bolt 96 is an actuating lever 98. One arm 100 of the lever 98 is secured to the Bowden cable 24 and the arms 100, 102 are movable about bolt 96, arm 102 moving into and out of the hook opening 104 of hook member 92 as the lever 98 is pivoted about bolt 96. A compression spring 106 is positioned about Bowden cable 24 exerts force against arm 100 of lever 98 and the Bowden cable anchor member 108. Compression spring 106 by exerting pressure on arm 100 biases the arm 102 into the hook area 104. When the latch plate 66a is secured in the hook 92 by placing the latch plate 66a in the hook area 104 the lever 98 is pivoted about bolt 96 compressing the spring 106 and moving the Bowden cable 24.

In operation, when the seat belt 18 is extended to an operating position about the body of the occupant and the latch plate 66 or 66a is inserted into and latchably engaged by its respective anchoring means 22 or 122, the associated bellcrank lever 52 or lever 98 is actuated about its respective pivot points so as to move the Bowden cable 24 away from its free end anchoring means. The Bowden cable 24 is thus actuated toward the belt retracting and end latching means 26 previously described with reference to FIGURES 4-7. As the distal end of the Bowden cable moves within the slot 88 of the control plate 82, the spring 76 is permitted to rotate the belt locking pawl 74 toward its position shown in FIGURE 5, wherein the teeth 78 of the pawl bind and thus lock the belt 18 between the case 70 and the locking pawl 74. Should there be too much slack in the seat belt after it is placed in operating position, the locking pawl 74 may be manually released by the handle 80 allowing the retracting reel 68 to retract the excess amount of belt back onto the reel. When the handle 80 is released, the biasing spring 76 will again rotate the pawl 74 to its belt locking position.

When the free end of the seat belt 18 is released and removed from either free end anchoring means 22 or 122, their respective springs 58 or 106 swing the bellcrank 52 or actuating lever 98 about their respective pivots so as to actuate the Bowden cable towards the free end anchoring means and away from the retracting end latching means. The resultant movement of the retracting end of the Bowden cable along the control slot 88 rotates the locking pawl 74 out of locking engagement with the belt 18 against the spring 76, thus freeing the belt 18 to be retracted about reel 69 to a stored position.

While the preferred embodiments of the present invention have been shown and described herein, it is obvious that many structural details may be changed without departing from the spirit and scope of the following claims.

We claim:

1. A seat belt assembly adapted to be mounted for use with a seat comprising a seat belt, a storage case therefor, said seat belt being movable from a stored to an operating position, retracting means in said storage case to retract said seat belt into said storage case, locking means for securing one end of said seat belt adjacent said storage case when said seat belt is in operating position, anchoring means spaced from said storage case adapted to cooperate with the other end of said seat belt to secure said other end of the seat belt in operating position and actuating means in said anchoring means interconnected with said locking means, said actuating means being adapted to cooperate with said other end of the seat belt to actuate said locking means.

2. A seat belt assembly as claimed in claim 1 wherein the retracting means is a spring biased reel rotationally supported in said storage case to which one end of said seat belt is secured to be wound thereabout.

3. A seat belt assembly as claimed in claim 1 wherein a control cable is used to interconnect said actuating means and said locking means.

4. In a vehicle body having a seat assembly mounted therein, a seat belt associated with said seat assembly, said seat belt assembly comprising a seat belt having a free end and a secured end, said seat belt being movable between an operating position and a stored position, a storage case, a spring biased retracting reel rotatably supported in said case for retracting and storing said seat belt, said secured end of said seat belt being attached to said retracting reel, a locking means positioned adjacent said storage means being adapted to permit free movement of said seat belt when said locking means is in unlocked position and being adapted to resist movement of said seat belt when in locked position, an anchor plate secured to the free end of said seat belt, an anchoring means spaced from said storage means adapted to cooperate with said anchor plate to secure the free end of said seat belt in operating position, an actuating lever mounted in said anchoring means, said actuating lever being adapted to be moved by the insertion or removal of said anchor plate in said anchoring means, a control cable interconnecting said actuating lever and said locking means whereby movement of said actuating lever by the insertion of said anchor plate in said anchoring means moves said locking means to locked position and removal of said anchor plate from said anchoring means moves said locking means to unlocked position, and a handle in said locking means for manually unlocking said locking means.

5. A retractable seat belt assembly adapted to be mounted for use with a seat, said assembly comprising a first belt anchoring means including a storage case, a seat belt having one end secured within the case, means for normally retracting the belt into said case, a second belt anchoring means spaced from said case and operable to detachably fasten the other end of the belt when the belt is withdrawn from the case to an extended operating position, and means operably interconnected between said belt anchoring means and operated by the fastening of said other belt end by said second belt anchoring means to condition said first anchoring means to prevent further withdrawal of the belt from the storage case.

6. A seat belt assembly adapted to be mounted for use with a seat, said assembly comprising a seat belt storage case, a seat belt having one end secured within said case, means for normally retracting said seat belt into said case, a belt securing means spaced from said case and operable to latchably secure the other end of the seat belt when withdrawn from said storage case, locking means for preventing movement of the belt into and from said storage case, said locking means being operably connected for actuation by said belt securing means in response to the latchable securing of said other belt end thereto, and means for normally releasing said locking means to allow movement of said belt to and from said case when said other end is latchably secured by said securing means.

7. A seat belt assembly mountable for use with a vehicle seat, said assembly comprising a seat belt, means for mounting said seat belt for movement between a stored position and an extended operating position, locking means for securing said seat belt adjacent said belt mounting means, an anchoring means spaced from said belt mounting means and adapted to latchably secure the extended end of the seat belt to maintain the seat belt in an extended operating position, and means associated with said anchoring means and operably connected for actuation by the securing of said extended belt end to actuate said locking means to secure the seat belt adjacent the belt mounting means.

8. A seat belt assembly as set forth in claim 7, further including means for manually releasing said locking means to allow movement of said belt to and from said mounting means when the extended end is fastened to said anchoring means.

References Cited in the file of this patent
UNITED STATES PATENTS

| | | |
|---|---|---|
| 2,708,555 | Heinemann | May 17, 1955 |
| 2,939,519 | McCall | June 7, 1960 |